A. R. DODGE.
FLOW METER.
APPLICATION FILED NOV. 17, 1913.
1,181,749.
Patented May 2, 1916.
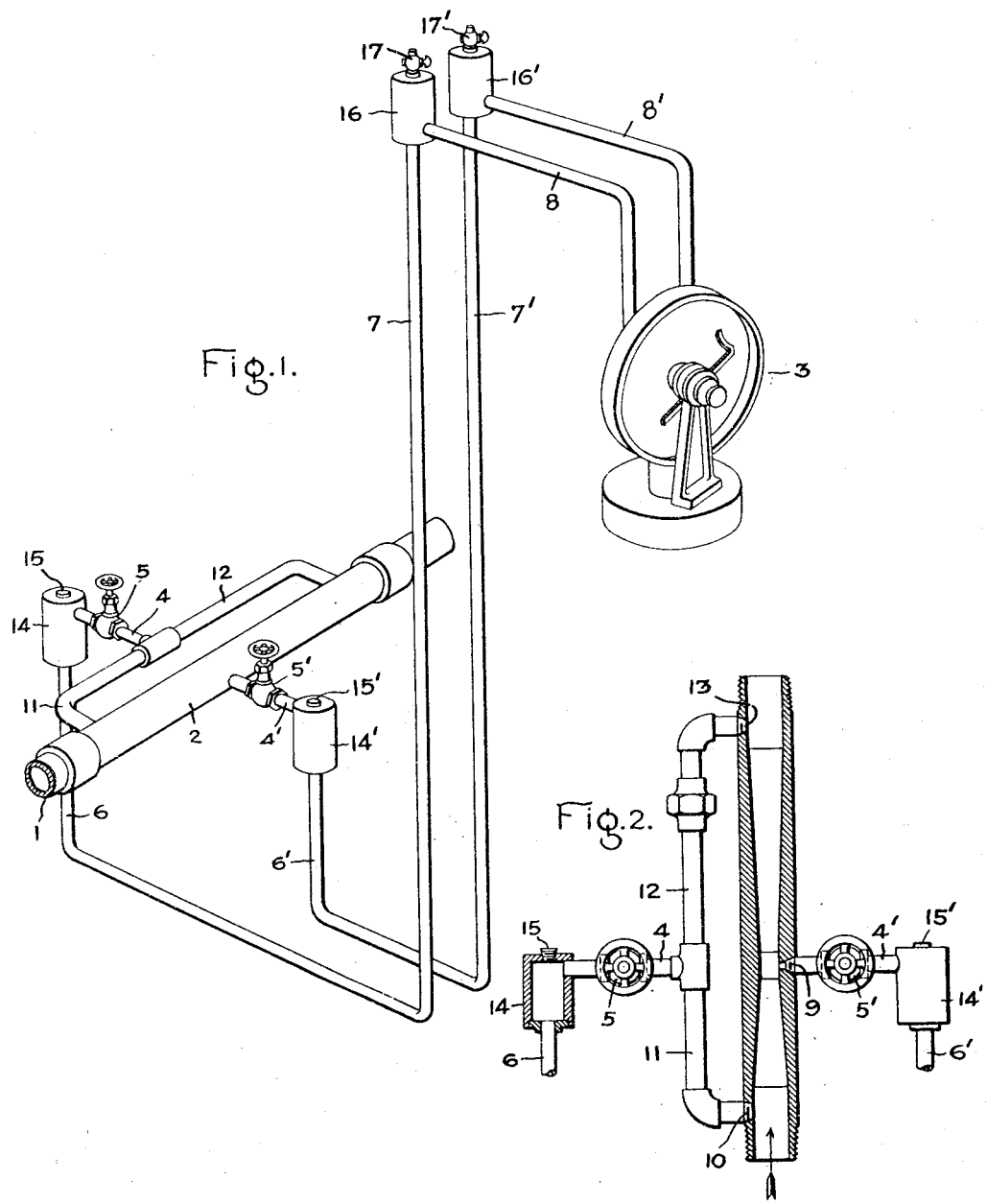
Witnesses:
Marcus L. Byng.
J. Ellis Glen.
Inventor:
Austin R. Dodge,
by Albert G. Davis
His Attorney.

UNITED STATES PATENT OFFICE.

AUSTIN R. DODGE, OF SCHENECTADY, NEW YORK, ASSIGNOR TO GENERAL ELECTRIC COMPANY, A CORPORATION OF NEW YORK.

FLOW-METER.

1,181,749.  Specification of Letters Patent.  Patented May 2, 1916.

Application filed November 17, 1913. Serial No. 801,359.

*To all whom it may concern:*

Be it known that I, AUSTIN R. DODGE, a citizen of the United States, residing at Schenectady, county of Schenectady, State of New York, have invented certain new and useful Improvements in Flow-Meters, of which the following is a specification.

My invention relates to flow meters and more particularly to flow meters for use in measuring the flow of condensable vapor, as steam, through conduits.

Flow meters of the type to which my invention relates comprise broadly an agent which is associated with the conduit conveying the fluid to be measured and which is adapted to create a pressure difference varying with the rate of such flow, a pressure responsive device which may be designed for indicating or recording, or both, and suitable piping connecting the agent and the device through which the variations in pressure are transmitted from the agent to the device. The piping comprises two conduits, each connected at one end to the pressure responsive device and at the other end to the points of high and low pressure of the agent referred to above. In order that the flow meter shall be accurate in its readings it is necessary that the pressure be transmitted through a medium, such as water, and that the piping system be at all times substantially filled. It is further necessary that the pressure heads due to this medium be kept at all times practically equal, since as is obvious any variation between the relation of the two pressure heads will introduce errors into the meter readings. To this end it is necessary that the pipes be connected into the indicating device and also into the steam conduit in the same horizontal planes.

In the operation of an arrangement as just referred to, a variation in the rate of flow of steam being metered causes the column of water in the one pipe to be lowered and that in the other raised. This varying causes a spilling over of fluid, which "spill" passes into the main conduit. The amount of this "spill" from the one pipe will be replaced in the other pipe by the condensing of steam, thus quickly equalizing the pressure heads. When the agent used to create the pressure differences is in the form of a Venturi or orifice tube, it is objectionable to have the "spill" enter the same through the high pressure connection, which connection is joined into the normal section of the Venturi tube in advance of the low pressure connection, for reasons which will be pointed out hereinafter.

One feature of my present invention relates to an arrangement used in connection with a Venturi or orifice tube for taking care of the "spill" from the high pressure pipe, as will be fully explained hereinafter.

In the arrangements of the general character referred to above it has heretofore been considered necessary to locate the indicating device at a point below the steam carrying conduit in order that the pressure conducting pipes might at all times be retained full of water and the pressure heads equal. By my present invention I have designed a system of piping whereby the indicating device may be located at a point above the steam carrying conduit, and the same still be operated in an accurate and efficient manner. Such an arrangement is of primary importance where the steam carrying conduit is located near to or beneath the ground as it permits the placing of the indicating instrument at a convenient and accessible point for observation.

Still other features of my invention will be pointed out hereinafter.

Referring to the accompanying drawing wherein I have illustrated an embodiment of my invention, Figure 1 shows diagrammatically my piping arrangement as used in connection with a horizontally arranged Venturi tube embodying my improved arrangement for taking care of the spill; and Fig. 2 is a view partially in section taken longitudinally of the Venturi tube and showing how my improved arrangement is adapted for use in connection with a vertically extending steam conduit.

The numeral 1 indicates a conduit through which the steam to be metered flows and into which has been introduced a Venturi or orifice tube section 2. An instrument of any approved or desired type which responds to variations of pressure is shown at 3. This instrument would ordinarily be in the form of a manometer and could be provided with suitable indicating and recording mechanisms as desired. The particular form of the instrument forms no part of the present invention. Connecting the instrument 3 with the orifice tube section 2 are the high pressure conduit and the low pressure conduit which are shown as comprising respectively a horizontal section 4 or 4' in which is arranged a suitable controlling valve 5 or 5', a depending section 6 or 6', a vertically extending section 7 or 7', and a section 8 or 8' leading from a point below the end of the section 7 or 7' to the instrument 3. The horizontal section 4' connects directly into the throat of the orifice tube as shown at 9.

In order that the water pressure heads in the two connecting pipes may be the same it is necessary that the pipes 4 and 4' be arranged in exactly the same horizontal plane and in order that this may be accomplished by a single set of connections at no matter what angle the orifice tube is placed I have arranged the connections as shown in the drawing. To this end the horizontal sections 4 and 4' are arranged in the same horizontal and vertical planes and the conduit 4 is connected into the high pressure orifice 10 of the orifice tube by the pipe section 11 which extends parallel to the orifice tube. By this arrangement it is clear that other things remaining constant no matter at what angle the orifice tube is placed, the pressure heads will remain the same.

In the operation of a meter arranged as described there is a "spill" from one connection or the other whenever a variation in the steam flow occurs as has been referred to above and as is well understood. It is clear that if this spill collected in the pipe 11 when the pipe is in any but a horizontal position such a collection would cause a variation in the relation of the pressure heads. It is also objectionable to have this "spill" enter the conduit in advance of the throat of the orifice tube as the same tends to disturb the normal flow of the steam. In order to take care of this "spill" and to overcome the objections noted, the pipe 11 is extended by means of pipe 12 to a point beyond the throat of the orifice tube where it is connected into the orifice tube through a restricted opening as shown at 13. The location of the point 13 is such that there is a difference in pressure between the points 10 and 13, the pressure at 13 being lower than that at 10. This will cause a flow from 10 through pipes 11 and 12 to point 13, and by this means the "spill" will be carried off through pipe 11 and enter the main conduit at 13. The opening 13 is of such a restricted nature as not to affect the building up of the pressure from point 10 through pipes 11, 4, 6, etc., to the indicating instrument 3.

When a "spill" occurs on one side of the piping leading to the meter there is a corresponding depression on the opposite side, the water on this opposite side being to a certain extent replaced by steam in the depending tube. Although in a short time this steam will be replaced by water obtained by the condensation of steam, nevertheless for a time it unbalances the pressure heads and introduces an error in the readings. In order to reduce the error due to this cause to a minimum I connect the upper ends of the pipes 6 and 6' to the pipes 4 and 4' by means of enlarged chambers as shown at 14 and 14'. By this means, the displacement of a given amount of water will cause a comparatively small change in the pressure head. These chambers may take the form of small reservoirs, the pipes 4 and 4' being connected into the same near the tops thereof and the conduits 6 and 6' leading from the bottoms. Suitable plugs 15 and 15' permit of ready access to the interiors of these reservoirs.

As before stated, the pipes 8 and 8' are connected into the pipes 7 and 7' at points below the upper ends thereof. This arrangement provides an air trap so that any air getting into the piping will rise and be entrapped in the tops of the pipes 7 and 7'. In order to increase the capacity of these traps I have shown the ends of the pipes 7 and 7' as being provided with reservoirs 16 and 16', having suitable cocks 17 and 17' in their tops, which may be opened to permit the escape of any entrapped air or gases.

Where the conduit 1 extends close to the ground the depending pipes 6 and 6' may be buried if found necessary. By the use of these depending sections I am enabled to place my indicating instrument at a point above the conduit and still obtain accurate operation of the same under all conditions.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:—

1. The combination of an agent for creating a pressure difference in a fluid to be metered that bears a definite relation to the rate of flow through the main, a pressure responsive device located at a point above said agent, piping connecting said device to said agent, said piping having a portion extending to a lower level than said agent to form a trap, and a portion at a point above said device, and an air trap at the highest point in said piping.

2. The combination of an agent for creating a pressure difference in a fluid to be metered that bears a definite relation to the rate of flow through the main, a pressure responsive device located at a point above said agent, and a high pressure conduit and a low pressure conduit connecting said agent to the pressure responsive device, each of said conduits including a section extending below the agent and an enlarged portion in said section.

3. The combination of an agent for creating a pressure difference in a fluid to be metered that bears a definite relation to the rate of flow through the main, a pressure responsive device located at a point above said agent, and a high pressure conduit and a low pressure conduit connecting said agent to the pressure responsive device, each of said conduits including a depending section connected to and extending below the agent, and an enlarged portion forming the upper end of each of said depending sections.

4. The combination of an agent for creating a pressure difference in a fluid to be metered that bears a definite relation to the rate of flow through the main, a pressure responsive device located at a point above said agent, and a high pressure conduit and a low pressure conduit connecting said agent to the pressure responsive device, each of said conduits comprising a depending section having an enlargement at its upper end, a vertically extending section which extends to a point above said device, and a section connecting said device to said vertical extension at a point below the top of said vertically extending section.

5. The combination of an agent for creating a pressure difference in a fluid to be metered that bears a definite relation to the rate of flow through the main, a pressure responsive device located at a point above said agent, and a high pressure conduit and a low pressure conduit connecting said agent to the pressure responsive device, each of said conduits comprising a depending section having an enlargement at its upper end, a vertically extending section having an enlarged top and which extends to a point above said device and a section connecting said device to the lower portion of said enlarged top.

6. In a flow meter for condensable vapors, the combination of a pressure responsive device, a main conduit carrying the vapor to be metered, a Venturi section inserted in said conduit, a low pressure pipe connecting the throat of the Venturi section to the indicating device, a high pressure pipe connecting the normal section of the Venturi tube in advance of the throat to the indicating device, said connecting pipes being normally filled with fluid of condensation for transmitting pressure, and means connected with the high pressure pipe for carrying the overflow of fluid therefrom away from the point of connection of the high pressure pipe to the Venturi section.

7. In a flow meter for condensable vapors, the combination of a pressure responsive device, a main conduit carrying the vapor to be metered, a Venturi section inserted in said conduit, a low pressure pipe connecting the throat of the Venturi section to the indicating device, a high pressure pipe connecting the normal section of the Venturi tube in advance of the throat to the indicating device, said connecting pipes being normally filled with fluid of condensation for transmitting pressure, and a pipe connecting the high pressure pipe to the Venturi section at a point beyond the throat thereof.

8. In a flow meter for condensable vapors, the combination of a pressure responsive device, a main conduit carrying the vapor to be metered, a Venturi section inserted in said conduit, a low pressure pipe connecting the throat of the Venturi section to the indicating device, a high pressure pipe connecting the normal section of the Venturi tube in advance of the throat to the indicating device, said connecting pipes being normally filled with fluid of condensation for transmitting pressure, and a pipe connecting the high pressure pipe to the Venturi section at a point beyond the throat thereof as regards the direction of flow, said connection being through a restricted orifice.

9. In a flow meter, the combination of a Venturi section, a pipe extending parallel to said section and means connecting the ends of said pipe into said section on opposite sides of the throat, the connection to the down-stream end of said section being through an orifice of lesser diameter than the other.

10. In a flow meter, the combination of a Venturi section, a high pressure pipe connected thereto in advance of the throat as regards the direction of flow, said pipe including a portion extending parallel to the Venturi section, and a second pipe connecting the parallel portion to said Venturi section beyond the throat as regards the direction of flow, such connection to said Venturi section being through a restricted orifice.

11. As an article of manufacture, a Venturi section having an opening in its throat, and a pipe on the opposite side of the Venturi section from the throat opening extending parallel to said section and connected thereto on opposite sides of the throat, one of said connections being through a restricted orifice, said pipe having an opening opposite to said throat opening.

In witness whereof, I have hereunto set my hand this 15th day of November, 1913.

AUSTIN R. DODGE.

Witnesses:
 BENJAMIN B. HULL,
 MARGARET E. WOOLLEY.